United States Patent [19]

Andrepont

[11] 4,453,960

[45] Jun. 12, 1984

[54] LIQUID-SOLID SEPARATION APPARATUS AND METHOD

[75] Inventor: John S. Andrepont, Lisle, Ill.

[73] Assignee: Chicago Bridge & Iron Company, Oak Brook, Ill.

[21] Appl. No.: 419,954

[22] Filed: Sep. 20, 1982

[51] Int. Cl.³ .......................... B01D 9/04; B01D 45/12
[52] U.S. Cl. .......................................... 62/542; 62/123; 209/144; 209/211; 210/512.1
[58] Field of Search .......................... 62/532, 542, 123; 210/512.1, 787, 788; 209/144, 211

[56] References Cited

U.S. PATENT DOCUMENTS

| | | |
|---|---|---|
| 1,919,653 | 7/1933 | Hill .................................... 210/512.1 |
| 3,292,386 | 12/1966 | Johnson et al. ...................... 62/532 |
| 4,372,766 | 2/1983 | Andrepont ............................ 62/532 |

Primary Examiner—Frank Sever
Attorney, Agent, or Firm—Marshall, O'Toole, Gerstein, Murray & Bicknell

[57] ABSTRACT

Provided is a freeze concentration apparatus and method which embody means designed, sized and arranged for inhibiting ice deposition including an enclosed cyclonic concentrator vessel having unobstructed, smooth faced interior walls.

14 Claims, 7 Drawing Figures

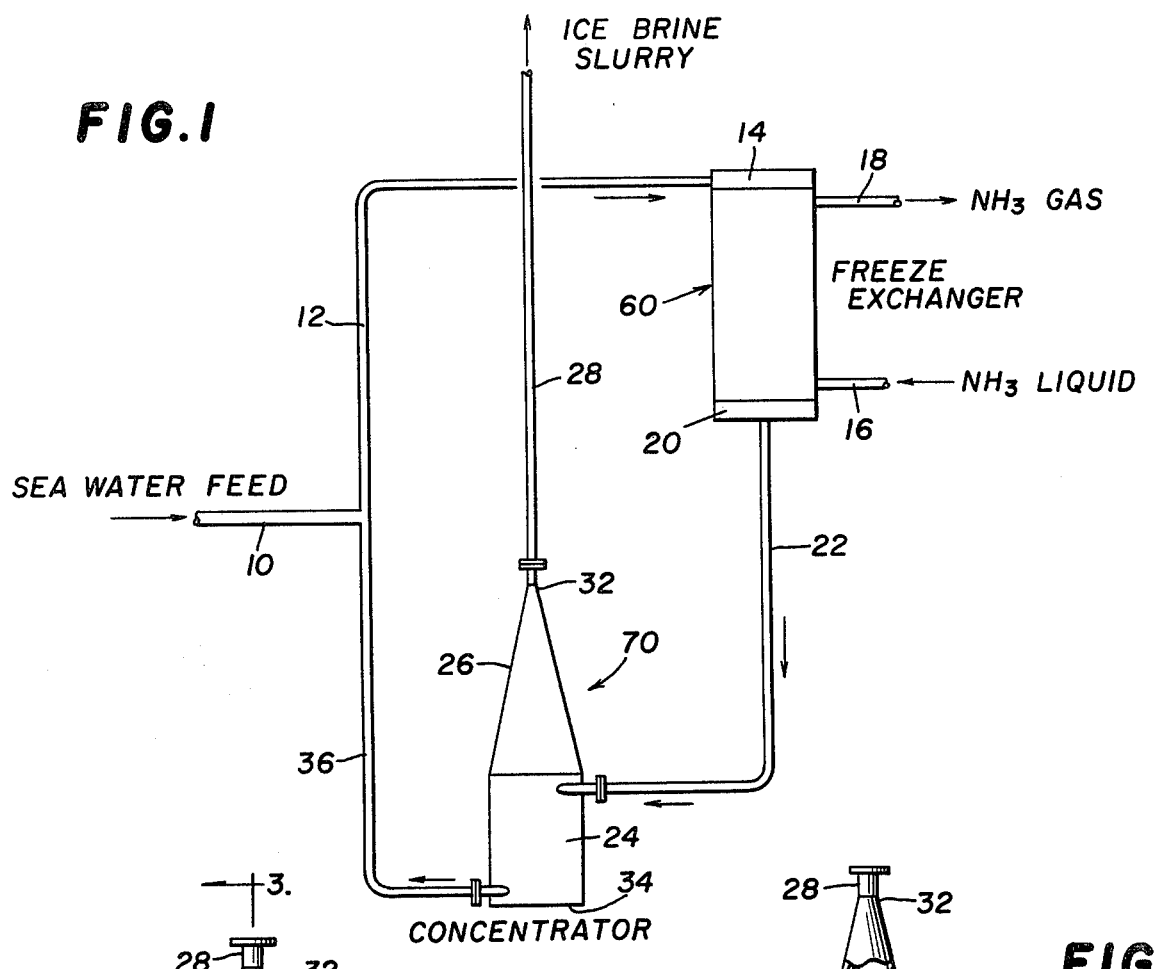
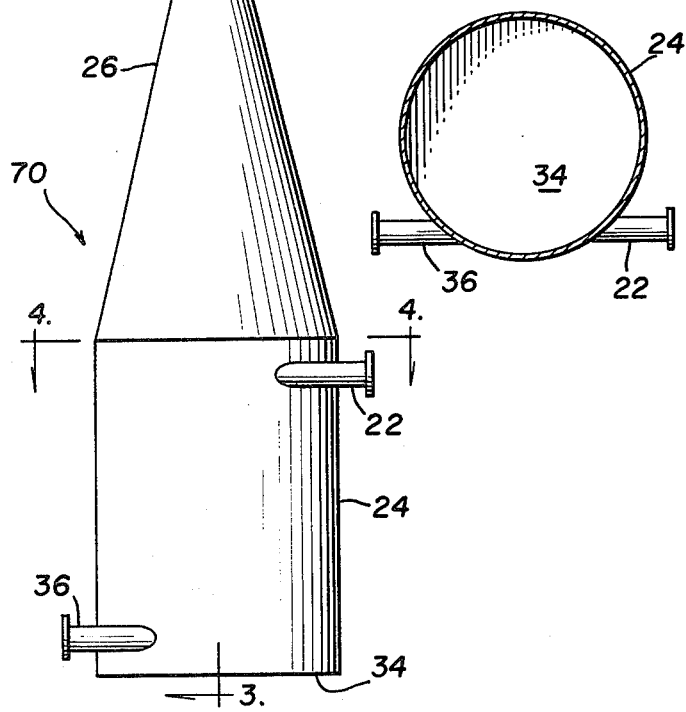

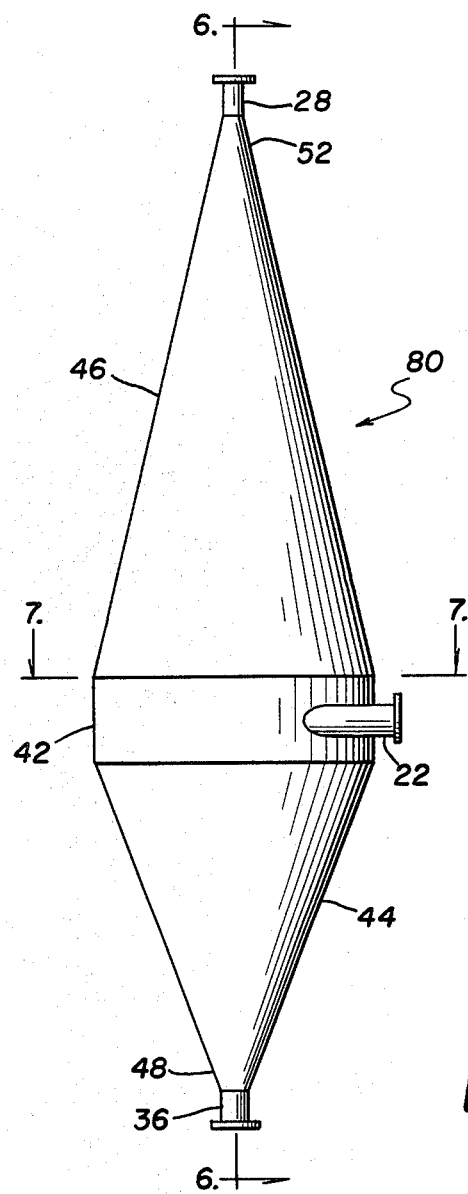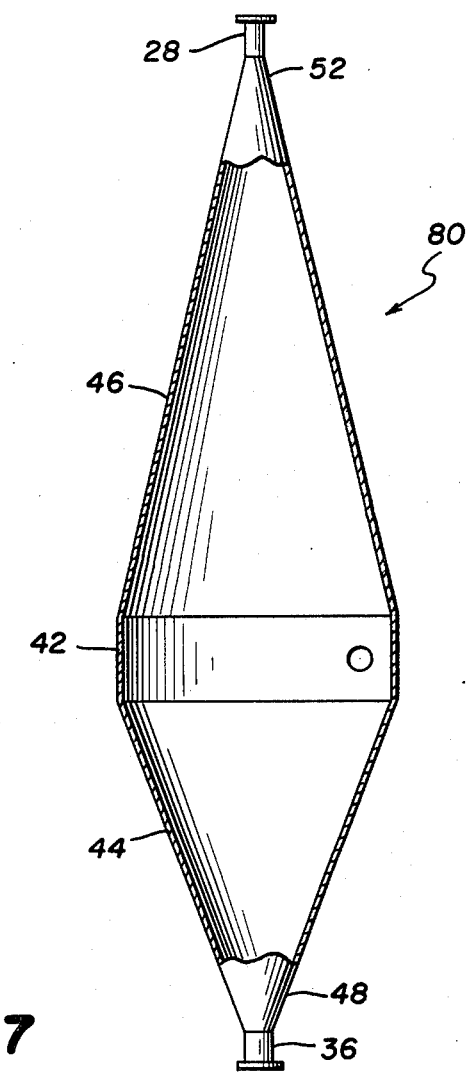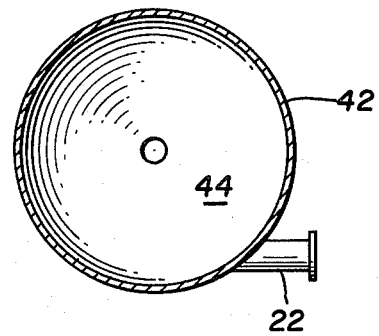

LIQUID-SOLID SEPARATION APPARATUS AND METHOD

This invention relates to apparatus for, and methods of, concentrating a liquid mixture such as fruit and vegetable juices, seawater, brackish water, waste water, and chemical solutions and dispersions, by freezing a portion of the solvent, usually water.

BACKGROUND OF THE INVENTION

It is often necessary, or at least desirable, to concentrate a liquid mixture by removing a portion of the solvent, generally water, from the liquid mixture. The resulting product, therefore, is in a more concentrated form. It has been common to concentrate radioactive waste (rad waste), cooling tower blow down waste water, fruit and vegetable juices such as orange juice, grapefruit juice, grape juice, and tomato juice by evaporation to remove water. In addition, seawater and brackish water have been concentrated by evaporation, although the condensed vapor has been recovered as usable potable water rather than discarded as in concentrating fruit and vegetable juices. Nevertheless, each is a concentrating process. In the case of juice, the concentrate is the desirable product whereas in obtaining potable water from seawater or brackish water the concentrate is discarded.

Evaporative concentration as described, as well as evaporation of chemical solutions or liquid dispersions, requires substantial energy since it relies on the latent heat of vaporization. Scaling of equipment and enhanced corrosion are often inherent at the temperatures involved in evaporative concentration. Loss of flavor and aroma also result during evaporative concentration of food products.

Because of the shortcomings involved in evaporative concentration, it has been found advantageous to freeze concentrate many products, particularly those having water as the liquid carrier. In such a process, water is removed by first producing ice crystals which are then separated from the concentrate. Next, the ice crystals are washed to remove the remaining concentrate from them. The ice crystals can then be discarded or melted if potable water is desired.

Engdahl U.S. Pat. No. 4,314,455 discloses a freeze concentration apparatus and process. In FIG. 2 of that patent a two stage freeze concentration system is disclosed. The aqueous mixture which is separated from the ice formed in the process is recirculated to the freeze exchanger.

The mixture of ice and water exiting the freeze exchanger is very dilute in ice concentration so that it is very desirable to increase the solids concentration before it is sent to an ice washer. Apparatus and methods suitable for such concentration do not appear available in the art even though a need exists for them not only to concentrate ice in water but to concentrate any solids from a liquid having a relatively different density than the solids i.e., the solids can be more dense or less dense than the liquid.

SUMMARY OF THE INVENTION

According to one aspect of the invention, there is provided apparatus for continuously separating a feed stream comprising a mixture of a liquid containing dispersed solid particles into a first stream of the liquid more concentrated in solid particles than the feed stream and a second stream of the liquid less concentrated in solid particles than the feed stream, said apparatus comprising an enclosed concentrator vessel defined by a shell having a vertical axis and which is circular in horizontal section for most of its height, and with the vessel having upper and lower ends; the shell including a conical portion with the apex at one end of the vessel; a liquid mixture feed stream inlet tangential to the vessel and communicating with the vessel interior space between the vessel upper and lower ends; an outlet near the apex of the conical portion communicating with the vessel interior space for removing a liquid mixture more concentrated in solid particles than the feed stream; and an outlet near the other end of the vessel communicating with the vessel interior space for removing a liquid mixture less concentrated in solid particles than the feed stream.

The conical portion apex can constitute the vessel upper end. In addition, the shell can have a cylindrical portion joined to the conical portion. When a cylindrical portion is included, each end of the cylindrical portion can have a conical portion.

The feed stream inlet is desirably located horizontal to the shell. In addition, when the vessel has a conical portion apex, the outlet is desirably located at said apex.

It is especially advantageous to have the vessel interior walls smooth faced and the vessel interior space unobstructed, thereby permitting the liquid mixture to flow freely therein so that the solid particles separate largely by gravity.

No interior baffles, obstructions, covers, pockets or flow stagnation points to trap solids need be nor should be in the vessel. Thus, all interior surfaces can be cleanly shaped and continuously swept by liquid to inhibit adhesion and build-up of solids. Internal flow patterns minimize turbulence and thus avoid remixing and enhance separation.

The conical portion provides a high solids content overflow region which resists clogging with solids and it can be readily cleared of clogged solids by internal liquid pressure.

A centrifugal action, although not essential for separation, further acts on the solids, if the solids are less dense than the liquid, to enhance the separation provided by gravity.

By variations in overflow-underflow volumetric flow ratio, it is possible to produce high and low solids content streams from inlet streams which vary from moderately high to moderately low solids content.

According to a second aspect of the invention there is provided a freeze concentration apparatus comprising a feed stream conduit communicating with a freeze exchanger for delivering a liquid mixture to the freeze exchanger for cooling therein to form crystals in the liquid mixture; a conduit extending from an outlet of the freeze exchanger to an enclosed concentrator vessel inlet for delivering crystal-containing liquid mixture from the freeze exchanger to the concentrator vessel; said enclosed concentrator vessel being defined by a shell having a vertical axis and which is circular in horizontal section for most of its height, and with the vessel having upper and lower ends; the shell including a conical portion with the apex at one end of the vessel; the crystal-containing liquid mixture feed stream inlet communicating with the vessel interior space between the vessel upper and lower ends; a first outlet near the apex of the conical portion communicating with the vessel interior space for removing a liquid mixture more concentrated in crystal particles than the inlet stream; and a second outlet near the other end of the vessel communicating with the vessel interior space for removing a liquid mixture less concentrated in crystal particles than the inlet stream; a conduit extending from the concentrator vessel first outlet for removing the more concentrated crystal-containing liquid mixture; and a conduit extending from the concentrator vessel second outlet to a freeze exchanger inlet for conveying the less concentrated crystal-containing liquid mixture from the concentrator to the freeze exchanger.

The concentrator vessel employed in such apparatus can be one such as was more fully characterized above.

The invention also provides a method of increasing the concentration of solid particles or crystals dispersed in a liquid mixture feed stream containing the same comprising feeding the liquid mixture feed stream containing dispersed particles into an inlet of an enclosed vessel defined by a shell having a vertical axis and which is circular in horizontal section for most of its height, and with the vessel having upper and lower ends; the shell including a conical portion with the apex at one end of the vessel; and with the liquid mixture feed stream inlet tangential to the vessel and communicating with the vessel interior space between the vessel upper and lower ends; removing a liquid mixture more concentrated in solid particles than the feed stream through an outlet near the apex of the conical portion communicating with the vessel interior space; and removing a liquid mixture less concentrated in solid particles than the feed stream through an outlet near the other end of the vessel communicating with the vessel interior space.

The conical portion apex will be at the upper end of the vessel when the particles float in the liquid and the conical portion apex will be at the lower end of the vessel when the particles sink in the liquid.

The method is particularly useful when the liquid is water or an aqueous liquid solution and the particles are ice crystals.

The vessel used in the described method is desirably provided with interior walls which are smooth faced and the vessel interior space is unobstructed thereby permitting the liquid mixture to flow freely therein so that the solid particles separate largely by gravity.

According to a further aspect of the invention, a freeze concentration method is provided by comprising delivering a liquid mixture feed stream to a freeze exchanger for cooling it therein to form crystals in the liquid mixture; removing crystal-containing liquid mixture from the freeze exchanger and feeding it through an inlet of an enclosed concentrator vessel defined by a shell having a vertical axis and which is circular in horizontal section for most of its height, and with the concentrator vessel having upper and lower ends; the shell including a conical portion with the apex at one end of the concentrator vessel; and with the liquid mixture feed stream inlet tangential to the concentrator vessel and communicating with the concentrator vessel interior space between the vessel upper and lower ends; removing a liquid mixture more concentrated in crystals than the feed stream thereto through an outlet near the apex of the conical portion communicating with the concentrator vessel interior space; and removing a liquid mixture less concentrated in crystals than the feed stream thereto through an outlet near the other end of the concentrator vessel communicating with the concentrator vessel interior space and recycling said less concentrated mixture to the freeze exchanger. Any concentrator vessel of the type described above can be used in this method.

BRIEF DESCRIPTION OF THE DRAWINGS

FIG. 1 is a schematic diagram of a novel combination of apparatus provided by the invention for separating an ice brine slurry, with the apparatus including a concentrator according to the invention;

FIG. 2 is an enlarged elevational view of the concentrator shown in FIG. 1;

FIG. 3 is a sectional view taken along the line 3—3 of FIG. 2;

FIG. 4 is a sectional view taken along the line 4—4 of FIG. 2;

FIG. 5 is an elevational view of a second embodiment of a concentrator provided by the invention;

FIG. 6 is a sectional view taken along the line 6—6 of FIG. 5; and

FIG. 7 is a sectional view taken along the line 7—7 of FIG. 5.

DETAILED DESCRIPTION OF THE DRAWINGS

To the extent it is reasonable and practical, the same numbers will be used to identify the same or similar elements shown in the various views of the drawings.

With reference to FIG. 1, sea water feed line or conduit 10 communicates with conduit 12. Conduit 12 communicates with the liquid distribution box 14 at the top of shell and tube freeze exchanger 60. The freeze exchanger 60 is cooled on the shell side by circulating a suitable coolant around the tubes, not shown, in the freeze exchanger. Thus, a refrigerant, and specifically ammonia, can be supplied as a liquid to the shell side by conduit 16 and removed as a gas by conduit 18.

As the sea water flows through the tubes in freeze exchanger 60 it is cooled and ice crystals form in it. The very dilute slurry formed in the tubes collects in the slurry collecting box 20 at the bottom of the freeze exchanger 60 and flows from it to conduit 22 with which it is in fluid communication. Conduit 22 also communicates, desirably via a pump, not shown, tangentially and horizontally with the upper portion of cylindrical circular shell 24 of concentrator 70.

Concentrator 70, in addition to lower cylindrical shell 24, has a conical shell upper portion 26 positioned with the apex at the top and the bottom joined to the top of cylindrical shell 24. Conduit 28 communicates with the upper internal space of concentrator 70 through the apex 32. The lower end of the concentrator is closed by a flat bottom plate 34 joined to the lower edge of cylindrical shell 24. Conduit 36 communicates tangentially and horizontally with the lower internal space of cylindrical shell 24.

The sea water dilute ice slurry is fed by conduit 22 into the concentrator 70 at a high flow rate, thereby causing the liquid to flow spirally around the smooth unobstructed internal space of the concentrator 70. As the slurry flows spirally the ice crystals, being lighter than the sea water, flow or move upwardly in the conical portion 26 and are thereby concentrated. As a result, a slurry more highly concentrated in ice crystal content is generated in the upper portion of the conical portion 26 from which it can be withdrawn by conduit 28 and sent to an ice-brine separator for further handling in a conventional manner.

The sea water or brine having very little ice can be removed from the concentrator 70 through conduit 36 and be delivered, desirably via a pump, not shown, to conduit 12 with which it is in fluid communication. In this way, some brine is recycled in the system while makeup sea water is continuously or periodically supplied to the recycled stream by means of conduit 10.

All interior spaces in concentrator 70 are made smooth to deter ice from attaching to the surfaces and building up in a mass which could interfere with slurry flow or even plug the unit entirely. Furthermore, no baffles, vanes or other equipment is provided in the concentrator internal space since it is unnecessary and would facilitate formation of ice deposits in the concentrator.

A second embodiment of the invention is illustrated by FIGS. 5 to 7. The concentrator 80 shown in those figures has a circular cylindrical shell portion 42, a conical shell lower portion 44 and a conical shell upper portion 46. The apex 48 of the conical lower portion 44 is intended to be joined to conduit 36 when ice of some other solid is crystallized in the process which is lighter than the liquid carrier. Similarly, the apex 52 of the conical upper portion 46 is intended to be joined to conduit 28 when the crystallized solid is lighter than the liquid carrier.

Dilute slurry is supplied to concentrator 80 by conduit 22 which is horizontally positioned on and tangentially joined to cylindrical portion 42. As a result, the slurry fed to the concentrator is immediately directed into a spiral flow pattern which induces the crystallized solids, such as ice when sea water is being processed, to be displaced upwardly into the interior space of upper conical portion 46. This results in formation of a more concentrated slurry in that portion of the concentrator. The more concentrated slurry can then be withdrawn through conduit 28, washed and the washing liquid then recycled into the system if desirable. The liquid containing much less solid particles flows to conical lower portion 44 from which it can be removed through conduit 36 and be recycled as previously described.

The concentrator 80 contains no internal baffles, flanges or other equipment to which ice or other solids would be inclinded to stick and build up and block liquid flow. All internal surfaces are made smooth and are polished to prevent adherence of ice or other solids. If desired, the concentrator internal surface can be coated with a plastic film or layer to which the ice has a very low adherence propensity.

The concentrator 80 is shown in FIGS. 5 to 7 with the lower conical portion 44 shorter than the upper conical portion 46. However, the conical portions can be made of equal length or the upper conical portion can be made shorter than the bottom conical portion.

The apparatus and concentrators 70 and 80 can also be used when the crystallized solid is heavier than the carrier liquid. When such is the case, the solids will preferentially settle in the conical lower portion 44 of concentrator 80. However, the concentrator 70 would have to be inverted to be used with such heavier solids. Furthermore, operation of the system would require that conduits 32 and 36 be interchanged with respect to each other and their connections to the concentrator.

Some of the main construction features and advantages of the concentrators provided by the invention can be summarized as follows:

1. The interior is free of baffles, obstructions, corners, pockets or flow stagnation points to trap solids; all internal surfaces are cleanly shaped and continually swept by liquid flow to inhibit adhesion and build-up of solids;

2. Internal flow patterns minimize turbulence and thus avoid remixing and enhance solids separation;

3. A high solids content region resistant to clogging with solids and readily cleared of clogged solids by internal liquid pressure;

4. A centrifugal action on the relatively low density solids (ice) and the relatively higher density liquid (water) to enhance the separation provided by gravity alone; and 5. Through variations in overflow-underflow volumetric flow ratio, the capability to produce high and low solids content streams from inlet streams can be varied from moderately high to moderately low solids content.

EXAMPLE

A test vessel was built and operated to demonstrate the invention. The approximate dimensions of the test vessel were as follows: a lower, vertical axis, cylindrical portion twelve inches in diameter and twenty-four inches high, and an upper conical portion twenty-four inches high and tapering in diameter from twelve inches to an apex fitted with an overflow stream outlet. A feed inlet was positioned horizontally and tangentially to the cylindrical portion adjacent to the conical portion. An underflow stream outlet was positioned at the bottom of the cylindrical portion. The vessel interior was smooth and without obstructions.

An example of one operating condition for the vessel involved dividing a feed stream of moderately low ice content into an overflow stream of high ice content and an underflow stream of low or no ice content. Specifically, a feed stream of approximately twenty-one gallons per minute of slurry comprising approximately four and one half percent ice by weight in aqueous sodium chloride was continuously and repeatably divided into an overflow stream of approximately six gallons per minute comprising approximately sixteen percent ice by weight in aqueous sodium chloride and an underflow stream of approximately fifteen gallons per minute comprising aqueous sodium chloride with no ice present.

The foregoing detailed description has been given for clearness of understanding only, and no unnecessary limitations should be understood therefrom as modifications will be obvious to those skilled in the art.

What is claimed is:

1. Apparatus comprising elements designed, sized and arranged for continuously concentrating a feed stream comprising a mixture of an aqueous liquid containing ice particles by separating the feed stream into a first stream of the aqueous liquid more concentrated in ice particles than the feed stream and a second stream of the aqueous liquid less concentrated in ice particles than the feed stream, said apparatus comprising:

means designed, sized and arranged for inhibiting ice deposition, including an enclosed concentrator vessel defined by a shell having a vertical axis and which is circular in horizontal section for most of its height, and with the vessel having upper and lower ends;

the shell including a conical portion with the apex at the upper end of the vessel;

an aqueous liquid mixture feed stream inlet tangential to the vessel and communicating with the vessel interior space between the vessel upper and lower ends;

an outlet near the apex of the conical portion communicating with the vessel interior space for removing an aqueous liquid mixture more concentrated in ice particles than the feed stream;

an outlet near the other end of the vessel communicating with the vessel interior space for removing an aqueous liquid mixture less concentrated in ice particles than the feed stream; and the vessel interior walls being smooth faced and the vessel interior space is unobstructed thereby permitting the liquid mixture to flow freely therein so that the ice particles separate largely by gravity.

2. Apparatus according to claim 1 in which the conical portion apex is the vessel upper end.

3. Apparatus according to claim 1 or 2 in which the shell has a cylindrical portion joined to the conical portion.

4. Apparatus according to claim 3 in which each end of the cylindrical portion has a conical portion.

5. Apparatus according to claim 1 in which the feed stream inlet is horizontal to the shell.

6. A freeze concentration apparatus comprising elements designed, sized and arranged for continuously concentrating an aqueous liquid mixture feed stream comprising:

a feed stream conduit communicating with a freeze exchanger for delivering an aqueous liquid mixture to the freeze exchanger for cooling therein to form ice crystals in the liquid mixture;

a conduit extending from an outlet of the freeze exchanger to an enclosed concentrator vessel inlet for delivering ice crystal-containing aqueous liquid mixture from the freeze exchanger to the concentrator vessel;

means designed, sized and arranged for inhibiting ice deposition, including an enclosed concentrator vessel being defined by a shell having a vertical axis and which is circular in horizontal section for most of its height, and with the vessel having upper and lower ends; the shell including a conical portion with the apex at the upper end of the vessel; the ice crystal-containing aqueous liquid mixture feed stream inlet communicating with the vessel interior space between the vessel upper and lower ends; a first outlet near the apex of the conical portion communicating with the vessel interior space for removing an aqueous liquid mixture more concentrated in ice crystals than the inlet stream; and a second outlet near the other end of the vessel communicating with the vessel interior space for removing an aqueous liquid mixture less concentrated in ice crystals than the inlet stream;

a conduit extending from the concentrator vessel first outlet for removing the more concentrated ice crystal-containing liquid mixture;

a conduit extending from the concentrator vessel second outlet to a freeze exchanger inlet for conveying the less concentrated ice crystal-containing aqueous liquid mixture from the concentrator vessel to the freeze exchanger; and the concentrator vessel interior walls being smooth faced and the vessel interior space is unobstructed thereby permitting the aqueous liquid mixture to flow freely therein so that the ice crystals separate largely by gravity.

7. A freeze concentration apparatus according to claim 6 in which the concentrator vessel inlet is tangential to the vessel.

8. A freeze concentration apparatus according to claim 6 or 7 in which the concentrator vessel conical portion apex is the upper end of the vessel.

9. a freeze concentration apparatus according to claim 6 or 7 in which the concentrator vessel shell includes a cylindrical portion joined to the conical portion.

10. A freeze concentration apparatus according to claim 9 in which a conical portion extends from each end of the cylindrical portion.

11. A freeze concentration apparatus according to claim 7 in which the feed stream inlet is horizontal to the shell.

12. A method of increasing the concentration of ice crystals dispersed in an aqueous liquid mixture feed stream containing the same comprising:

feeding the aqueous liquid mixture feed stream containing dispersed ice crystals which float in the liquid into an inlet of an enclosed vessel comprising elements designed, sized and arranged for inhibiting ice deposition including a shell having a vertical axis and which is circular in horizontal section for most of its height, and with the vessel having upper and lower ends; the shell including a conical portion with the apex at the upper end of the vessel; and with the aqueous liquid mixture feed stream inlet tangential to the vessel and communicating with the vessel interior space between the vessel upper and lower ends;

removing an aqueous liquid mixture more concentrated in ice crystals than the feed stream through an outlet near the apex of the conical portion communicating with the vessel interior space;

removing an aqueous liquid mixture less concentrated in ice crystals than the aqueous liquid feed stream through an outlet near the other end of the vessel communicating with the vessel interior space; and the vessel interior walls being smooth faced and the vessel interior space is unobstructed thereby permitting the aqueous liquid mixture to flow freely therein so that the ice crystals separate largely by gravity.

13. A freeze concentration method comprising:

delivering an aqueous liquid mixture feed stream to a freeze exchanger for cooling it therein to form ice crystals in the liquid mixture;

removing ice crystal-containing aqueous liquid mixture from the freeze exchanger and feeding it through an inlet of an enclosed concentrator vessel designed, sized and arranged for inhibiting ice deposition, including a shell having a vertical axis and which is circular in horizontal section for most of its height, and with the concentrator vessel having upper and lower ends; the shell including a conical portion with the apex at the upper end of the concentrator vessel; and with the aqueous liquid mixture feed stream inlet tangential to the concentrator vessel and communicating with the concentrator vessel interior space between the vessel upper and lower ends;

removing an aqueous liquid mixture more concentrated in ice crystals than the aqueous feed stream thereto through an outlet near the apex of the conical portion communicating with the concentrator vessel interior space;

removing an aqueous liquid mixture less concentrated in ice crystals than the feed stream thereto through an outlet near the other end of the concentrator vessel communicating with the concentrator vessel interior space and recycling said less concentrated aqueous mixture to the freeze exchanger; and the concentrator vessel interior walls being smooth faced and the vessel interior space is unobstructed thereby permitting the aqueous liquid mixture to flow freely therein so that the ice crystals separate largely by gravity.

14. A method according to claim 13 in which the conical portion apex is at the upper end of the concentrator vessel when the particles can float in the liquid.

* * * * *

UNITED STATES PATENT OFFICE
CERTIFICATE OF CORRECTION

PATENT NO. : 4,453,960
DATED : June 12, 1984
INVENTOR(S) : JOHN STEPHEN ANDREPONT It is certified that error appears in the above–identified patent and that said Letters Patent are hereby corrected as shown below:

column 1, line 56, change "concentration" to --concentrating--;

column 5, line 19, change "of" to --or--, line 31, before "interior" insert --upper--; column 8, line 4, change "a" to --A--; column 10, line 5, place a period (.) after "vessel" and delete "when the particles can float in the liquid."

Signed and Sealed this

Twenty-fifth Day of September 1984

[SEAL]

Attest:

GERALD J. MOSSINGHOFF

Attesting Officer  Commissioner of Patents and Trademarks